(12) United States Patent
Jentsch et al.

(10) Patent No.: US 9,058,176 B2
(45) Date of Patent: Jun. 16, 2015

(54) DOMAIN-SPECIFIC GENERATION OF PROGRAMMING INTERFACES FOR BUSINESS OBJECTS

(75) Inventors: Frank Jentsch, Muehlhausen (DE); Bare Said, Sankt-Leon-ROT (DE); Frank Brunswig, Heidelberg (DE)

(73) Assignee: SAP SE, Walldorf (DE)

( * ) Notice: Subject to any disclaimer, the term of this patent is extended or adjusted under 35 U.S.C. 154(b) by 47 days.

(21) Appl. No.: 13/484,942

(22) Filed: May 31, 2012

(65) Prior Publication Data
US 2013/0326470 A1  Dec. 5, 2013

(51) Int. Cl.
*G06F 9/44* (2006.01)
*G06F 9/45* (2006.01)

(52) U.S. Cl.
CPC ........ *G06F 8/35* (2013.01); *G06F 8/447* (2013.01); *G06F 8/40* (2013.01)

(58) Field of Classification Search
None
See application file for complete search history.

(56) References Cited

U.S. PATENT DOCUMENTS 6,023,578 A * 2/2000 Birsan et al. ........... 717/105
8,495,568 B2 * 7/2013 Ackerman ............... 717/120

* cited by examiner

*Primary Examiner* — Deric Ortiz
(74) *Attorney, Agent, or Firm* — Brake Hughes Bellermann LLP

(57) ABSTRACT

A code generator may determine an object metadata model which defines structures and behaviors of objects adapted for use in at least one software application, where the code generator includes an object analyzer configured to determine at least one object instance of the object metadata model, a domain analyzer configured to determine a domain associated with the at least one object instance, and a template selector configured to select a domain-specific code template based on the domain. The code generator may generate a domain-specific application program interface (API) configured to facilitate interactions of the at least one object instance during execution of the at least one software application, using the domain-specific code template.

17 Claims, 7 Drawing Sheets

| | Object Name ← 302 | Description ← 304 |
|---|---|---|
| 306 ↘ | ▼ 🗁 Business Object nodes | |
| 308 — ▶ 🔲 ROOT | Root |
| 310 — ▶ 🔲 SYSTEM_MESSAGE_TYPE | SystemMessageType |
| 312 — ▶ 🔲 NODE | Node |
| | ▶ 🗀 Node Elements ← 314 | |
| | ▶ 🗀 Actions ← 316 | |
| | ▶ 🗀 Associations ← 318 | |
| | ▶ 🗀 Queries ← 320 | |
| | ▶ 🔲 NODE_SYSTEM_MESSAGE_TYPE | NodeSystemMessageType |
| 322 —▶ 🔲 NODE_ELEMENT | NodeElement |
| 324 —▶ 🔲 NODE_KEY | NodeKey |
| | ▶ 🔲 NODE_SPEC_TYPE | NodeSpecializationType |
| | ▶ 🔲 NODE_SPECIALIZATION | NodeSpecialization |
| | ▶ 🔲 ACTION | Action ← 328 |
| 326 —▶ 🔲 ASSOCIATION | Association |
| | ▶ 🔲 QUERY | Query |
| | ▶ 🔲 DETERMINATION | Determination ← 330 |
| | ▶ 🔲 CONSISTENCY_VALIDATION | ConsistencyValidation ↖ 332 |
| | ▶ 🔲 STATUS_VARIABLE | StatusVariable |
| | ▶ 🔲 SAM_SCHEMA | SAMSchema |
| | ▶ 🔲 NODE_EXIT | NodeExit |

FIG. 3

| Object Name | Description |
|---|---|
| ▼ ⊚ FIA_ACCOUNTING_DOCUEMENT | AccountingDocument |
| ▶ ☐ Service Provider Class<br>▶ ☐ Service Provider Interface<br>▶ ☐ Business Object Nodes<br>▶ ☐ Process Component<br>▶ ☐ Extending BO<br>▼ ▣ ROOT | Root |
| ▶ ☐ Node Elements<br>▶ ☐ Associations<br>▶ ☐ Queries<br>▶ ☐ UI Text<br>▶ ▣ TextCollection.ROOT | Root |
| ▶ ▣ ITEM | Item |
| ▶ ☐ Governance Supplement<br>▶ ☐ KT Document | |

FIG. 5

| Object Name | Description |
|---|---|
| ▼ ⊛ FIA_FIXED_ASSET_DEPR | FixedAssetDepreciationRun |
| ▶ ☐ Service Provider Class | |
| ▶ ☐ Service Provider Interface | |
| ▶ ☐ Business Object Nodes | |
| ▶ ☐ Process Component | |
| ▶ ☐ template BO | |
| ▼ ▣ ROOT | Root |
| ▶ ☐ Node Elements | |
| ▼ ☐ Actions | |
| • ⊕ ACTIVATE | Activate |
| • ⊕ ADJUST_RESPONSIBLE_AGENT | AdjustResponsibleAgentAnd |
| ▶ ⊕ CREATE_WITH_REFERENCE | CreateWithReference |
| ▶ ⊕ CREATE_WITH_REF_FOR_CANC | CreateWithReferenceForCen |
| • ⊕ EXECUTE | Execute |
| • ⊕ FLAG_AS_OBSOLETE | FlagAsObsolete |
| • ⊕ REVOKE_OBSOLESCENCE | RevokeObsolescence |
| ▶ ⊕ SCHEDULE_DIRECTLY | ScheduleDirectly |
| ▶ ☐ Associations | |
| ▶ ☐ Queries | |
| ▶ ☐ Base node | |
| ▶ ☐ S&AM Schemas | |
| ▶ ☐ Status Variables | |
| ▶ ▣ DESCRIPTION | Description |
| ▶ ▣ EXECUTION | Execution |
| ▶ ▣ LOG | Log |
| ▶ ▣ PARAMETERS | Parameters |

FIG. 6

| Object Name | Description |
|---|---|
| ▼ ⊚ FIND_CITY_T005 | Country |
| ▶ ▢ Service Provider Class | |
| ▶ ▢ Service Provider Interface | |
| ▶ ▢ Business Object Nodes | |
| ▶ ▢ Extending BO | |
| ▶ ▣ ROOT | Root |
| ▼ ▢ KT Document | |

702 → (points to FIND_CITY_T005 row)
704 → (points to ROOT row)

FIG. 7

DOMAIN-SPECIFIC GENERATION OF PROGRAMMING INTERFACES FOR BUSINESS OBJECTS

TECHNICAL FIELD

This description relates to programming interfaces for business objects.

BACKGROUND

Many software applications are constructed and executed using discrete software objects, each of which may correspond to a real world entity and/or functionality. Each such software object may specify, for example, a type and content of data to be used by the software object, as well as behaviors of the software object in utilizing such data.

In particular examples of such model-driven implementations of software applications, business applications may be implemented using business objects corresponding to specified business entities and/or related functionalities. For example, business objects may be constructed which correspond to large scale entities, such as corporate departments (e.g., financial, human resources, or manufacturing), individuals (e.g., customers, employees, or business partners), or low-level data containers (e.g., individual documents or data tables).

In practice, such software objects, e.g., business objects, may be constructed using a meta-model which defines metadata governing a manner in which each business object is constructed. Then, since each object is constructed in accordance with at least a subset of the overall meta-model, the objects possess a high degree of interoperability, so that a software developer may easily combine desired business objects to thereby construct entire business applications.

Nonetheless, it may occur that one or more individual business objects include certain characteristics which are outside of a context of the meta-model. Consequently, it may be relatively more difficult to incorporate such business objects into a business application in a desired fashion.

SUMMARY

According to one general aspect, a system may include instructions recorded on a non-transitory computer readable storage medium and executable by at least one processor. The system may include a code generator configured to cause the at least one processor to determine an object metadata model which defines structures and behaviors of objects adapted for use in at least one software application. The code generator may include an object analyzer configured to determine at least one object instance of the object metadata model, a domain analyzer configured to determine a domain associated with the at least one object instance, and a template selector configured to select a domain-specific code template based on the domain. The code generator may be further configured to cause the at least one processor to generate a domain-specific application program interface (API) configured to facilitate interactions of the at least one object instance during execution of the at least one software application, using the domain-specific code template.

According to another general aspect, a computer-implemented method for causing at least one processor to execute instructions recorded on a computer-readable storage medium may include determining an object metadata model which defines structures and behaviors of objects adapted for use in at least one software application, determining at least one object instance of the object metadata model, and determining a domain associated with the at least one object instance. The method may further include selecting a domain-specific code template based on the domain, and generating a domain-specific application program interface (API) configured to facilitate interactions of the at least one object instance during execution of the at least one software application, using the domain-specific code template.

According to another general aspect, a computer program product tangibly embodied on a non-transitory computer-readable medium may include instructions that, when executed, may be configured to cause at least one processor to determine an object metadata model which defines structures and behaviors of objects adapted for use in at least one software application, determine at least one object instance of the object metadata model, and determine a domain associated with the at least one object instance. The instructions, when executed, may be further configured to select a domain-specific code template based on the domain, and generate a domain-specific application program interface (API) configured to facilitate interactions of the at least one object instance during execution of the at least one software application, using the domain-specific code template.

The details of one or more implementations are set forth in the accompanying drawings and the description below. Other features will be apparent from the description and drawings, and from the claims.

BRIEF DESCRIPTION OF THE DRAWINGS

FIG. 3 illustrates a portion of a business object meta-model.

FIG. 5 illustrates a portion of a business object meta-model utilized in the example of FIG. 4.

FIG. 6 illustrates a portion of a business object meta-model utilized in the example of FIG. 4.

FIG. 7 illustrates another example portion of a business object meta-model utilized in the example of FIG. 4.

DETAILED DESCRIPTION

Figure 1:
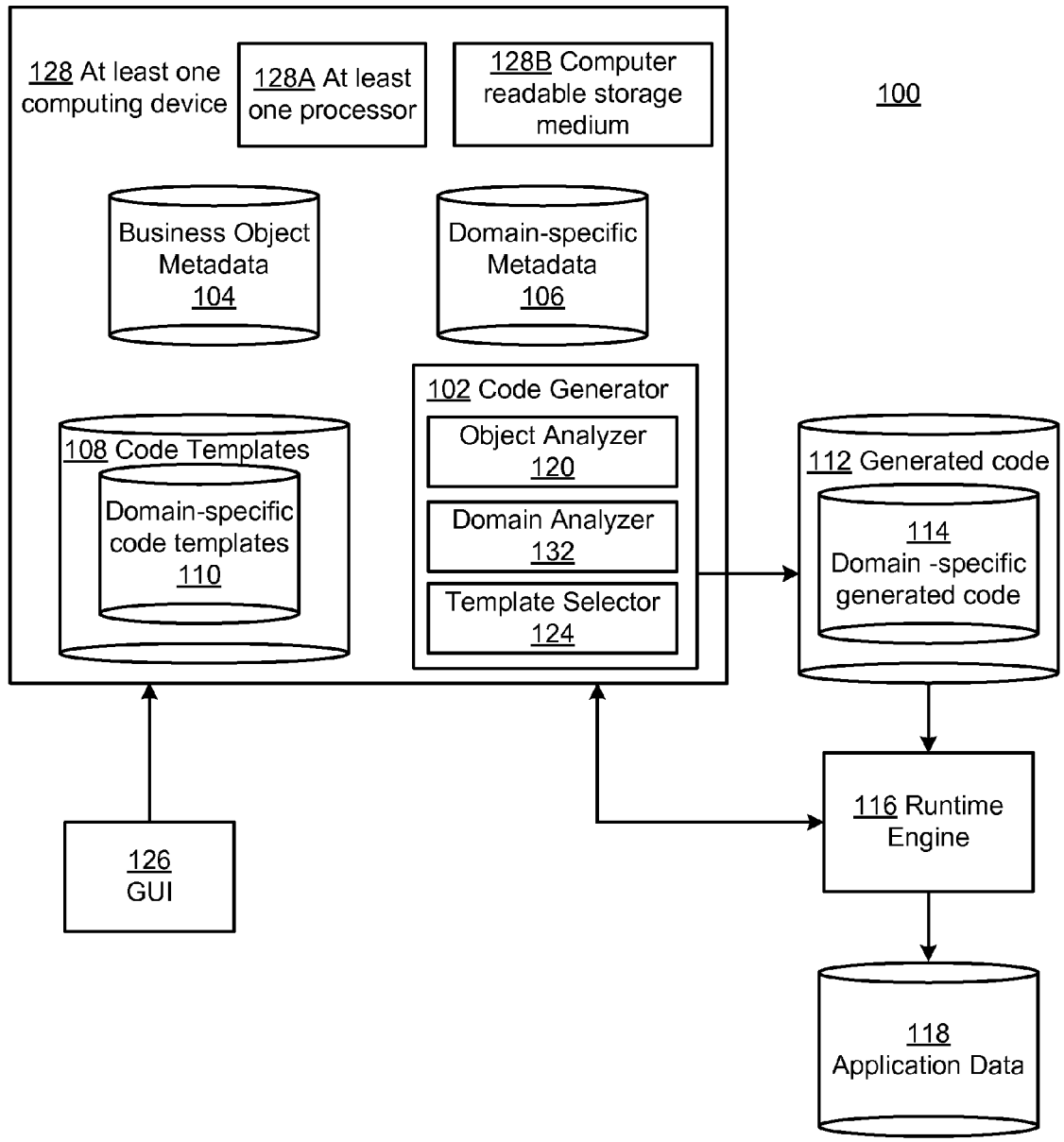
FIG. 1 is a block diagram of a system for domain-specific generation of programming interfaces for business objects.

FIG. 1 is a block diagram of a system 100 for domain-specific generation of programming interfaces for business objects. In the example of FIG. 1, a code generator 102 may be configured to access business object metadata 104, along with related domain-specific metadata 106. The code generator 102 may further utilize code templates 108 and domain-specific code templates 110, respectively, in order to provide generated code 112 and domain-specific generated code 114. In this way, as described in detail below, the code generator 102 may be configured to enable a runtime engine 116 associated with one or more software systems/applications to utilize the metadata 104, 106 in conjunction with the generated code 112, 114, and thereby process application data 118 in a desired manner. More particularly, the code generator 102 enables such operations of the runtime engine 116 in a manner which is automated and efficient, highly configurable with respect to the various domains, and implementable in a straightforward manner, without requiring significant technical knowledge on the part of a user of the code generator 102.

In more detail, the business object metadata 104, by itself, generally may represent or include the types of object metadata models referenced above, which may be utilized to define permitted/required structures, content, and behaviors of individual (or categories of) business objects. The use of such metadata models, and objects defined thereby, enables software developers and other users to work with a relatively abstract, high-level view of the underlying program code, and relaxes requirements on the software developers and other users to have detailed knowledge regarding technical details about actual implementations of infrastructure components.

In the examples described herein, the metadata 104 and related metadata models are described in conjunction with corresponding business objects. As is known, such business objects may include, for example, account objects, business partner objects, address objects, order objects and document objects, to name a few examples. Additional examples of such business objects are described in more detail below, and/or would be apparent to one of skill in the art. Moreover, the definition and use of such business objects may vary with respect to different users of the system 100. In general, however, it may be appreciated that such business objects may include virtually any business-related entity/operation which a user of the system 100 may wish to represent in the context of interactions with other business entities/operations in a model-driven development environment. Even more generally, although the term business object is used herein for the sake of example, it may be appreciated that the metadata 104 may be used to construct model-driven representations of virtually any type of context and related software objects. For example, such contexts may be related to educational, charitable, military, personal, or governmental contexts.

Nonetheless, for purposes of providing specific examples for the sake of description and explanation, various examples are provided herein in which the metadata 104 provides a metadata model for various business objects. In particular, as illustrated and described below with respect to FIGS. 3 and 5-7, the business object metadata 104 may provide a metadata model for various business objects and associated business operations. In particular, examples are provided in which various business objects include business objects for business partners, accounting documents (e.g., sales order documents), mass data processing/adjustment runs, and business configuration parameters.

As referenced above, the runtime engine 116 may be configured to process relevant portions of business application data 118, based on appropriate interpretations of relevant objects defined by the business object metadata 104. In this regard, the runtime engine 116 may work generically to process many different types of business objects. In this way, the system 100 may be utilized, e.g., to provide standardized services, and provide for integration of generic components with one another.

However, in many cases, a developer or other user of the system 100 may have non-generic requirements for operations of the runtime engine 116, such as when a service or application programming interface (API) of a specific business object is required. By virtue of providing such object-specific APIs, the code generator 102 may provide numerous features and advantages. To give one example, by providing such object-specific interfaces, the code generator 102 may be utilized to improve transparency for software developers, e.g., by offering various business object subcomponents as specific classes or methods that may easily be utilized by the software developer to obtain a desired result during operations of the runtime engine 116.

In the example of FIG. 1, such a result is illustrated and described with respect to the generated code 112 that is provided by the code generator 102, utilizing the business object metadata 104. In other words, the generated code 112 represents and includes APIs provided by the code generator 102, which are object-specific, but which are consistent with, and limited to, definitions, requirements, and other aspects of the overall metadata model included in the business object metadata 104.

Thus, the system 100 of FIG. 1 provides an example of the use of a business object meta-model of the business object metadata 104 in conjunction with the runtime engine 116, where the runtime engine 116 may represent the processing of many different types of frameworks, systems, or other applications or services (e.g., an enterprise services framework). Through the use of corresponding business objects governing structural and behavioral aspects, the system 100 provides for a uniform runtime behavior and contracts, using the common business object meta-model for many different categories of the business objects.

For example, such business object categories may include master data objects (e.g., business objects for customers, employees, and business partners), business transaction documents (e.g., accounting documents, sales orders, or requisition forms), mass data run objects (e.g., an adjustment run object), and business configuration objects (e.g., country/nation objects). Again, through the use of the common business object meta-model, interactions and interfaces between and among the various objects and categories of objects may be standardized in a relatively generic, uniform manner.

In practice, however, and as referenced above, many business objects (or groups of business objects) may have characteristics, features, or content which are not explicitly covered as such within the governing business object meta-model. Similarly, certain business objects (or groups of objects) may have certain features or requirements associated with optimal processing thereof, which would be unnecessary or suboptimal in the context of processing other ones of the business objects.

Therefore, in the example of FIG. 1, the code generator 102 may be configured to identify such objects, or groups of objects, and thereafter generate portions of the generated code 112 which are specific thereto. In the context of the present description, such code is referred to as the domain-specific generated code 114.

In this context, it may be appreciated that the term domain, by itself, may refer to individual contexts, settings, or arenas, e.g., in the business realm, which share a common feature, characteristic, or aspect. For example, in the business realm, the term domain, by itself, may refer to any defined portion or segment thereof, irrespective of the use of a system such as the system 100 of FIG. 1. For example, in a conventional business context, domain may be defined as including, e.g., a sales domain, a manufacturing domain, a retail domain, an accounting domain, a human resources domain, or many other domains related to a common business feature or characteristic.

In FIG. 1, and in the following examples, the term domain is defined and applied with respect to the business object metadata 104, in order to obtain or define desired domain-specific metadata 106. In the present description, therefore, the term domain should be understood to be an inclusive term, which encompasses the traditional uses of the word domain, as just referenced, as well as uses which are more particular to (e.g., defined in the context of) the system 100 of FIG. 1.

For example, if desired, the domain-specific metadata 106 may be specified to define domains in a manner which partially or completely overlaps with the various types of business object categories referenced above. Additionally, or alternatively, domains may be defined with respect to virtually any aspect of a given grouping of business objects. For example, as described in more detail below, certain business objects may include data fields which are language-dependent, where such language dependency may not be specified in an object-specific manner by the business object metadata 104. In another example, as also described in detail below, certain business objects may benefit from particular types of processing (e.g., may be particularly amenable to parallel processing thereof), so that corresponding domains which include such business objects may be specified as such.

In practice, then, a software developer, programmer, or other user may wish to utilize the system 100 to design and implement one or more new software applications (or modify/upgrade/update an existing software application). In this context, the term application should be understood to be an inclusive term which encompasses any service, component, module, or feature which may be executed by the runtime engine 116 in conjunction with the metadata 104, 106, the generated code 112, 114, and the application data 118.

As part of the efforts of designing and developing such an application, the developer may utilize the code generator 102 to obtain object-specific and domain-specific code 112, 114. More particularly, as referenced above and described in more detail below, the code generator 102 may apply code templates 108 in a specified manner to the business object metadata 104, in order to obtain generated code 112. For example, the generated code 112 may include object-specific application programming interfaces (APIs).

In the example of FIG. 1, the code generator 102 may be further configured to generate the domain-specific generated code 114, through the use of the domain-specific code templates 110 and the domain-specific metadata 106. For example, as shown, the code generator 102 may include an object analyzer 120 which may be configured to analyze a particular business object to be utilized in the context of a particular application development, and to thereby determine characteristics thereof which may relate to one or more domains to which the particular object belongs.

Meanwhile, a domain analyzer 122 of the code generator 102 may be configured to analyze the domain-specific metadata 106, to thereby determine portions thereof which are relevant to the object in question. Then, based on these outputs of the object analyzer 120 and the domain analyzer 122, a template selector 124 may be configured to select from the domain-specific code templates 110, for selection therefrom of any code templates needed to generate the domain-specific generated code 114.

Specific examples of the domain-specific generated code 114 are provided below. For the sake of example, however, and with reference to the description above, it may be appreciated that certain domains of objects defined by the business object metadata 104 include one or more fields containing language-dependent values (e.g., country code values in which abbreviations for a given country may vary, depending on a language being used). In other examples, certain domains of objects defined by the business object metadata 104 may benefit from the use of particular processing techniques (e.g., parallel processing techniques using multiple processing cores/threads). In these and other examples, the code generator 102 may be configured to consult the domain-specific metadata 106 and thereafter utilize appropriate ones of the domain-specific code templates 110, to thereby generate particular APIs for inclusion within the domain-specific generated code 114, such that the domain-specific generated code 114 includes relevant methods and other interface parameters/aspects which are suited to the domain in question.

In implementing the system 100, one or more graphical user interfaces (GUIs) may be utilized, as represented in the example of FIG. 1 by a GUI 126. For example, the GUI 126 may be utilized during a design, development, and maintenance of the business object's metadata 104, as well as for a design and implementation of the code template 108 for the generation of the generated code 112 therewith. More specifically, for example, the GUI 126 may be utilized to design the code templates 108, and may enable a software developer or other user of the system 100 to select a desired code template from the code templates 108, when generating the generated code 112.

Further, the GUI 126 may be utilized to design and implement the domain-specific metadata 106 and the domain-specific code templates 110. For example, the domain-specific metadata 106 may be constructed to include a domain-specific metadata model, which defines one or more domains for which the domain-specific generated code 114 may be desired. In this regard, it may be appreciated that the software developer or other user of the system 100 may be provided with great flexibility in configuring and defining specific domains, as well as configuring and defining corresponding metadata to be included within the domain-specific metadata 106.

Similarly in this regard, the GUI 126 may be utilized to design and implement the domain-specific code templates 110 in a desired fashion. That is, the domain-specific code templates 110 may be designed to include one or more code templates which may be applicable to one or more associated domains of business objects. In this way, it may be appreciated that many different types of APIs may be generated with respect to many different domains of business objects, while simultaneously ensuring interoperability and capability of the resulting domain-specific generated code 114 with all of the business objects of the domain in question.

In the example of FIG. 1, the code generator 102, along with the metadata 104, 106 and the templates 108, 110, is illustrated as executing in the context of at least one computing device 128. As shown, and as would be appreciated, the at least one computing device 128 may include or utilize at least one processor 128A, as well as at least one computer readable storage medium 128B. Of course, the at least one processor 128A and the computer readable storage medium 128B may be understood to represent or include any known or future examples of corresponding components that may be utilized in the context of the at least one computing device 128B. Further, it may be appreciated that any additional, or otherwise conventional, components may be utilized in the context of the at least one computer device 128, including, for example, components related to power, communications, input/output functions, and many other conventional features and functions that would be understood by one of skill in the art to be potentially implemented in the context of the at least one computing device 128.

Moreover, although the at least one computing device 128 is illustrated in the example of FIG. 1 as a single computing device, it may be understood that the at least one computing device 128 may represent two or more computers in communication with one another. Therefore, it will also be appreciated that any two or more of the components 102-110 and 120-124 may similarly be executed using some or all of the two or more computing devices in communication with one another. Conversely, it also may be appreciated that various components illustrated as being external to the at least one computing device 128 may actually be executed therewith. For example, the runtime engine 116 may be executed using the at least one computing device 128.

Analogously, it may be appreciated that any two components illustrated in the example of FIG. 1 may be executed together as a single component. Conversely, any single component of FIG. 1 may be understood to be executed using two or more subcomponents.

Thus, FIG. 1 illustrates example implementations in which the generated code 112, including the domain-specific generated code 114, may be generated in a straightforward, configurable, convenient, automatic manner. Moreover, the generated code 112, including the domain-specific generated code 114, may be obtained by a software developer or other user of the system 100, even when such a user has relatively limited knowledge with regard to how the application data 118 is structured and managed, because the model-driven environment of the system 100 provides a layer of abstraction which enables the user to obtain a desired result.

Figure 2:
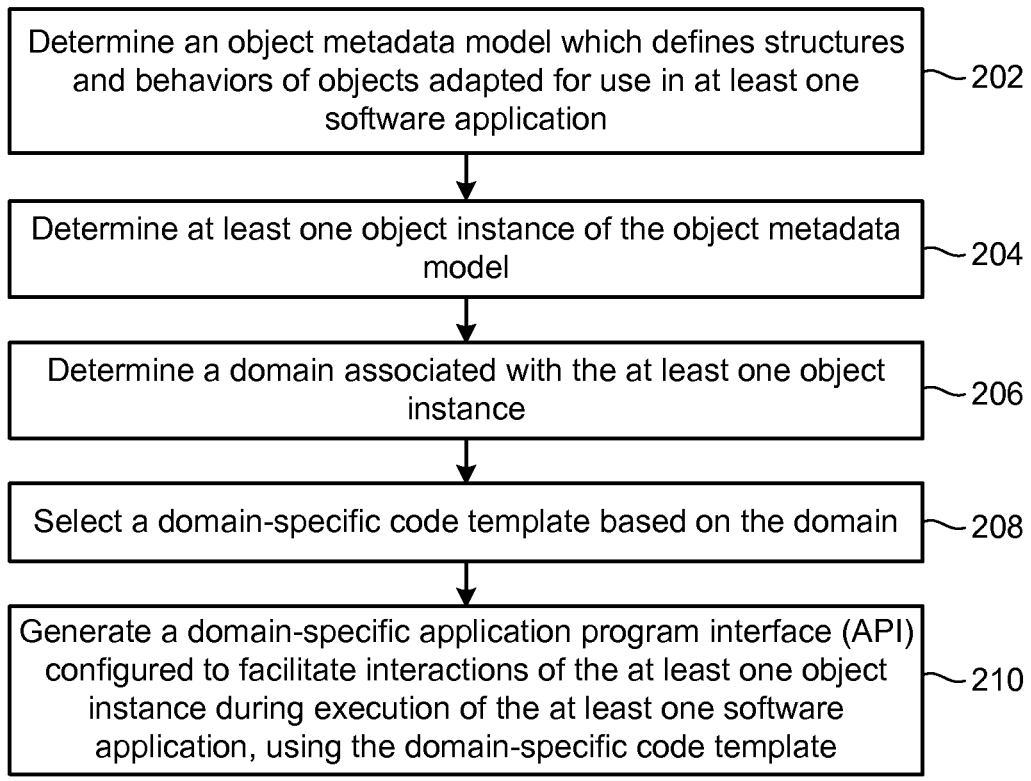
FIG. 2 is a flowchart illustrating example operations of the system of FIG. 1.

FIG. 2 is a flowchart 200 illustrating example operations 202-210 of the system 100 of FIG. 1. In the example of FIG. 2, operations 202-210 are illustrated as separate, sequential operations. However, it may be appreciated that, in various example implementations, the various operations 202-210 may be implemented in a partially or completely overlapping or parallel manner. Moreover, it may be appreciated that the operations 202-210 may be performed in an order different than that shown and described, e.g., in a nested, iterative, or looped fashion. Further, additional or alternative operations may be included, and one or more operations may be partially or completely omitted.

In the example of FIG. 2, an object metadata model which defines structures and behaviors of objects adapted for use in at least one software application may be determined (202). For example, the code generator 102 may determine a business object metadata model stored in the context of the business object metadata 104.

At least one object instance of the object's metadata model may be determined (204). For example, the object analyzer 120 may be configured to identify one or more object instances of the business object metadata 104. For example, a software developer or other user of the system 100 may specify desired or required objects for use in the at least one software application being developed, and/or may specify one or more features or functions desired to be included in the at least one software application. Specific examples of such object instances are referenced above, and described in more detail below, e.g., with respect to FIG. 4.

A domain associated with the at least one object instance may be determined (206). For example, the domain analyzer 122 may be configured to apply relevant aspects of the domain-specific metadata 106, for association thereof with the relevant, corresponding object instances. In other words, for example, the domain analyzer 122 may determine that a particular object instance belongs in, or is otherwise associated with, one or more domains, as specified by the domain-specific metadata 106.

A domain-specific code template may be selected, based on the domain (208). For example, the template selector 124 may be configured to select such a domain-specific code template from the domain-specific code template 110, based on a comparison of object characteristics received from the object analyzer 120, domain characteristics received from the domain analyzer 122, and on requirements of the at least one software application (e.g., as provided by the software developer by way of the GUI 126). For example, the domain analyzer 122 may identify inclusion of a specific object instance within two or more domains. Then, the template selector 124 may consider that only one of the identified domains is relevant to the application requirements specified by the software developer as being required for implementation of the associated software application to be executed by the runtime engine 116, and may select a particular code template accordingly.

A domain-specific application program interface (API) configured to facilitate interactions of the at least one object instance during execution of the at least one software application may be generated, using the domain-specific code template. For example, the code generator 102 may be configured to generate the domain-specific generated code 114, including/representing the just-referenced domain-specific APIs. In this way, during execution of the at least one software application by the runtime engine 116, each relevant object instance may execute in a highly configurable, flexible, efficient manner. Moreover, as may be appreciated, such execution may be obtained by the software developer in a straightforward, convenient manner.

FIG. 3 illustrates a portion of an example business object meta-model, such as may be included within the business object metadata 104. As described above, the use of a single such business object meta-model in the context of a particular execution framework including the runtime engine 116 provides for a uniform runtime behavior for all different categories of business objects.

In the example of FIG. 3, object names 302 are provided in conjunction with associated descriptions 304. Various business object nodes 306, which are illustrated as including associated root elements 308, system message types 310, and nodes 312. For example, various business object nodes 306 may refer to individual types of accounting documents, where each such accounting document is associated with a root, message types, and nodes. For example, one type of such accounting documents may include a sales order, so that the node 312 is associated therewith.

Then, as shown by the expanded node 312, each such node may include various additional sub-components defining associated structural and behavioral aspects of the node in question. For example, as shown, the node 312 may include various node elements 314, actions 316 that may be performed by the node, associations 318 with other nodes or other aspects of the business object meta-model, and queries 320 which may be executed by or against the node 312.

In the example, structural aspects of the business object node 312 are primarily defined by the node 312, including node elements 314 and associations 318. Individual instances of the business object in question may be further structurally defined using a node element 322, a node key 324, and an association 326. For example, in the context of accounting documents business objects including a sales order business object, the node element 322 may define the various fields of the sales order, such as, e.g., fields for including the price, item description, or customer. Meanwhile, the node key 324 may refer to a value for a uniquely identifying an individual sales order. The association 326 may refer to associations of the sales order with other nodes and/or other business objects, e.g., other sales orders, or associated business objects for items for sale or purchasing customers.

Meanwhile, behavioral aspects are defined by, e.g., action 328, determination 330, and consistency validation 332. As may be appreciated, generally speaking, action 328 may generally refer to operations that may be undertaken using, or in conjunction with, the sales order document. Determination 330 may refer, for example, a node to suggest certain actions in response to the occurrence of specific conditions. Further, consistency validation 332 may refer to behaviors associated with ensuring consistency of the sales order with other, related sales orders, and/or other related business objects.

Thus, it may be appreciated that FIG. 3 is generally intended to represent an example of a portion of a business object meta-model, for purposes of explanation of examples of operations of the system 100 of FIG. 1. Of course, it may be appreciated that many other types of object meta-models may be used in the context of the system 100 of FIG. 1, which are not described here in detail, for the purposes of clarity and conciseness. Similarly, such object meta-models, including the example portion of the business object meta-model of FIG. 3, may include varying types and levels of details in the various manners in which they characterize structural and behavioral aspects of associated objects. For example, as illustrated in FIG. 3, such objects of components may include message types, specializations and specialization types, status variables, schemas, and exit techniques for exiting the node in question. However, again for the sake of clarity and conciseness, in the description of FIG. 3 and in the following description of FIGS. 4-7, only those portions of the business object meta-model of FIG. 3 and related meta-models which are helpful in understanding the various features and functions of the system 100 of FIG. 1 are provided in detail.

Figure 4:
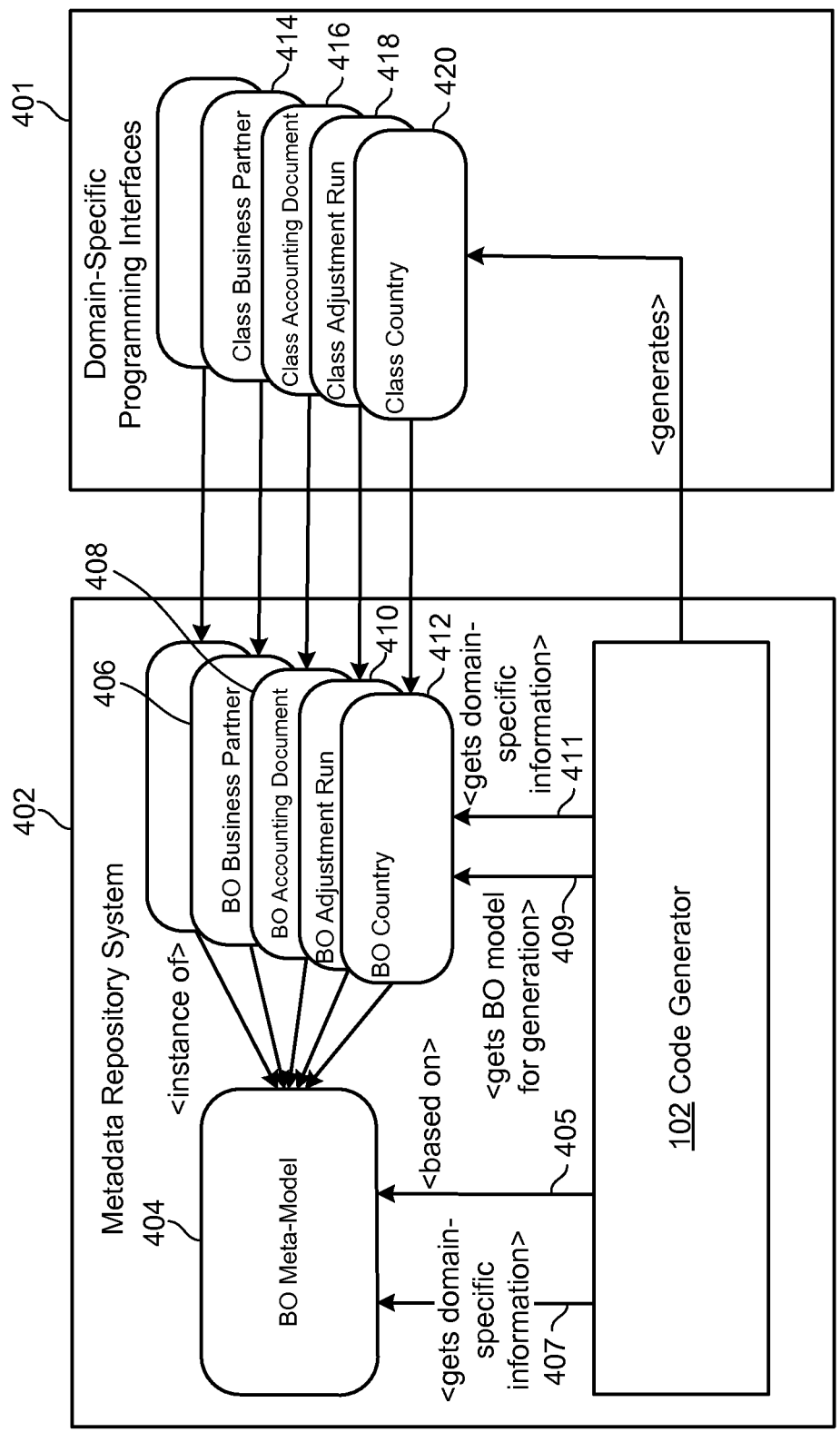
FIG. 4 is a block diagram of a more detailed example implementation of the system of FIG. 1.

FIGS. 4-7 and associated description provide specific example implementations of the system 100 and associated operations of the flowchart 200 of FIGS. 1 and 2, respectively, using the type of objects meta-model illustrated and described with respect to FIG. 3. Specifically, FIG. 4 is a block diagram of an example implementation of the system 100 of FIG. 1, which might utilize the type of object meta-model of FIG. 3.

In the example of FIG. 4, domain-specific programming interfaces 401 are generated using a metadata repository system 402. As shown, the metadata repository system 402 includes a business object meta-model 404, which might represent, e.g., the business object meta-model described above with respect to FIGS. 1 and 3. As also may be appreciated from the above description, the business object meta-model 404 may thus specify various instances of business objects, illustrated by way of example in FIG. 4 as including a business partner business object 406, an accounting document business object 408, an adjustment run business object 410, and a country business object 412.

As indicated by an arrow 405, the code generator 102 may be configured to access the business object meta-model 404, in order to determine relevant information regarding internal data structures of the business object meta-model 404. For example, in this way, the code generator 102 may determine a data structure of relevant objects, including a number of included fields, a number of included nodes, and the various actions and queries which may be defined for the relevant objects.

Thus, as indicated by the arrow 405, the code generator 102 may utilize the business object meta-model 404 to interpret the business object instances 406-412 (and associated data) in a manner that is useful for, and consistent with, generation of the desired programming interfaces for the software application being developed. For example, the various business object instances 406-412 may include data structures which may be interpreted differently depending on a nature of the business object meta-model 404 in question. As a particular example, programming interfaces may be generated for backend analysis and calculations, which may be very different from programming interfaces generated for the same business object instances and associated data structure, but in the context of a graphical user interface that is being developed.

In the latter case then, the code generator 102 would access a business object meta-model that is specific to defining and interpreting business object data structures in the context of graphical user interfaces.

Somewhat similarly, as indicated by an arrow 409, the code generator 102 may be configured to determine object-specific metadata information for each of the objects, e.g., 406, 408, 410, 412. In other words, as explained above, each of the business objects 406, 408, 410, 412 are subsets of, or otherwise including in, the overall business object meta-model 404, yet may also include object-specific information that is not pertinent to other objects or categories of objects. Therefore, the code generator 102 may retrieve such information with respect to a particular object, in much the same way as, and for the same reasons as, the code generator 102 extracts information regarding the make up of the business object meta-model 404 itself.

Additionally, as indicated by arrows 407, 411, the object analyzer 120 of the code generator 102 (not specifically illustrated in the example of FIG. 4), may be configured, as described above, to analyze meta information related to individual objects or categories of objects, and to thereby extract information which may be relevant to the domain-specific metadata 106 (also not illustrated in the example of FIG. 4). For example, any one or more of the objects 406, 408, 410, 412 may include fields or other information which may potentially be related to many different domains. The object analyzer 120 may utilize various techniques for identifying and extracting such information.

For example, the domain-specific information may be tagged as such within the relevant business object. Additionally, or alternatively, as indicated by the arrow 407, the object analyzer 120 may also utilize information derived from the business object's meta-model 404 as a whole, to use in identifying and extracting domain-specific information from within one or more of the objects 406, 408, 410, 412. In the latter case, for example, the business object meta-model 404 may specify various categories of business objects, so that the code generator 102 may first determine a category and its associated member business objects from the business object meta-model 404, to thereby determine whether one of the business objects 406, 408, 410, 412 is included in that category.

Then, as described, the domain analyzer 122 may perform operations associated with relating extracted object information with specific domains. For example, the object analyzer 120 may identify and extract many different fields associated with one or more domains. Then, the domain analyzer 122 may individually associate each such field with one or more of the potentially matching domains.

Then, of these matched sets of objects and domains, the template selector 124 may be configured to select those objects and domains which are relevant to a software application currently being developed, and to thereafter select one or more domain-specific code templates 110 to be utilized in providing the domain-specific programming interfaces 401. For example, as illustrated, the business partner business object 406 may be matched with a specific domain-specific code template 110 to obtain a programming interface 414. Similarly, business objects 408, 410, 412 may be matched with corresponding domain-specific code templates 110 to obtain corresponding programming interfaces 416, 418, 420, respectively.

In this way, the code generator 102 may conveniently and automatically provide the domain-specific programming interfaces 401. Further, although not specifically illustrated in the example of FIG. 4, it may be appreciated that the code generator 102 also may utilize the code templates 108 to generate code 112 that is not domain-specific, e.g., using information extracted in accordance with the arrows 407, 409 of FIG. 4. Thus, the systems of FIGS. 1 and 4 may be utilized to generate a wide variety of domain-specific and non-domain-specific code, in a manner that is convenient and efficient, and that ensures interoperability of all relevant business objects in the context of the runtime engine 116.

FIG. 5 illustrates a portion of a node structure of an accounting document business object 502, e.g., corresponding to the business object 408 of FIG. 4. The accounting document business object 502 of FIG. 5 may thus be understood to represent an instance of the type of business object meta-model 404 illustrated above with respect to FIG. 3. As such, due to the existence of the same underlying business object meta-model, the code generator 102 may generate corresponding programming interfaces using the same pattern across all existing domains. FIG. 5 illustrates a portion of the accounting document business object 502 from which such programming interfaces may be generated.

For example, the accounting document business object 502 structurally defines business object nodes root 504 and item 506 (as well as associations there between). As may be understood, the root node 504 may include header information of the accounting document in question, and represents header information of a specific accounting document (e.g., a sales order). Meanwhile, the item node 506 may include specific fields identifying attributes of the accounting document (e.g., a company identifier or document identifier). Thus, as an instance of the overall business object meta-model 504, the accounting document business object 502 includes, in pertinent part, two instances of node types, each representing entries of a node in the overall meta-model 404.

Thus, the generated code 112 provided by the code generator 102 may include programming interfaces designed to facilitate interactions between the accounting document business object 502 and other components of a software application being developed for execution within the runtime engine 116. By way of example, a programming interface "class ROOT, method RETRIEVE" may be generated for the purpose of retrieving data of all node elements for a given list of root instances. As another example, a programming interface "class ROOT, method TO_ITEM" may be generated to retrieve data of all associated items for a given list of root instances. As a final example, a programming interface "class ITEM, method RETRIEVE" may be generated to retrieve data of all node elements for a given list of item instances.

In the latter case, by way of a more specific example, it may be appreciated from the above description that the code generator 102 may utilize certain metadata of the business object meta-model 404 to generate the method "RETRIEVE" to provide data for the business object node "ITEM" 506. Specifically, in the example, each node instance may be identified by a unique key called NODE_ID. Then, the purpose of "RETRIEVE" method is to retrieve all data of the business object node for a given list of NODE_IDs. Therefore, an expected class and signature may be represented in the example of code portion 1:

---
Code Portion 1
---
CLASS cl_item DEFINITION.
   PUBLIC SECTION.
     METHODS retrieve
       IMPORTING
          node_ids     TYPE node_id_tab ---
-continued Code Portion 1
---
       EXPORTING
          messages     TYPE message_tab
       RETURNING
          VALUE(data)  TYPE item_tab.
     METHODS . . .
ENDCLASS.

---

In this regard, during the generation of the types of programming interfaces referenced above, the business object meta-model 404 is evaluated, and for each business object node, a separate class CL_<node_name> may be generated. This information may be provided as element NAME of node NODE in the business object meta-model 404. The accounting object business object 502 of FIG. 5 provides the above-described specific example in which such nodes include the root node 504 and the item node 506.

Then, the data container returned by the method RETRIEVE is statically typed, based on the model node data type: TYPE<typing data type>. Thus, this information may be provided as the element TYPING_DATA_TYPE of NODE in the business object meta-model 404.

FIG. 6 illustrates a portion of a business object meta-model associated with an adjustment run business object 602, corresponding to the adjustment run business object 410 of FIG. 4. More particularly, as shown, FIG. 6 illustrates a portion of the business object meta-model related to a fixed asset depreciation run.

In general, as generally known and as referenced above, such adjustment run business objects generally refer to, or include, large-scale processing of calculations that, by their nature, are individually performed with respect to corresponding business object instances and/or individual attributes or aspects thereof. For example, in the example of FIG. 6, fixed asset depreciation adjustment runs may be performed to calculate a specific amount of depreciation to be associated with each of a large number of assets owned by an enterprise. For example, such calculations may be required to be performed on an annual or semi-annual basis, e.g., for tax purposes.

In the example of FIG. 6, and analogously to the examples of FIGS. 3 and 5, the portion of the fixed asset depreciation run business object 602 includes a root node 604 and a parameters node 606. Thus, as described above with respect to FIG. 5, the root node 604 may correspond generally to header information associated with instances of the business object 602, while the parameters node 606 may include data relevant to business asset(s) for which depreciation will be calculated, and/or relevant parameters to be used in the depreciation calculations.

Further, as already described, mass data run objects such as the object 602 may advantageously be processed in parallel. For example, a second runtime engine may be used in conjunction with the runtime engine 116 in order to execute such parallel processing. In order to schedule mass data processing in this regard, a pre-defined action "execute" 608 may be included within the business object 602.

Thus, as already described above with respect to FIG. 5, the code generator 102 may consider the structure of the modeled business object 602, and generate the generated code 112 that is independent of any specific domain. For example, the code generator 102 might provide a programming interface "class ROOT, method RETRIEVE," to get the data of all node elements for a given list of root instances. Another example of such a programming interface might include "class ROOT, method TO_PARAMETERS," to get the data of all associated items for a given list of root instances. As a third and final example, a programming interface "class PARAMETERS, method RETRIEVE," may be created and utilized to retrieve data of all node elements for a given list of parameter instances.

Furthermore, the code generator 102 may be further configured to provide the domain-specific generated code 114. For example, as may be appreciated from the above descriptions of FIGS. 1 and 4, the code generator 102, or, more specifically, the object analyzer 120 may be configured to analyze the business object 602 and identify, among other characteristics, inclusion of the execute action 608. Meanwhile, the domain analyzer 122 may be configured to match the execute action 608 with domain-specific metadata 106 in order to associate the business object 602 with one or more domains defined to include such mass data run objects. Finally, the template selector 104 may be configured to select the thus-matched execute action 608 and associated domain with one or more of the domain-specific code templates 110.

In particular, the domain-specific code template 110 may be configured to enable the code generator 102 to generate one or more programming interfaces for conducting parallel processing of the application data 118 during execution of an associated software application by two or more runtime engines. For example, such domain-specific generated code may include a programming interface "class ROOT, method START_PARALLEL_PROCESSING." As may be appreciated, this programming interface may be generated automatically by the code generator 102, merely by virtue of inclusion of the business object 602 within the development process and associated software application. In this way, the developer of the software application may be required to have little or no knowledge of a manner in which the business object 602 is optimally included within the software application.

FIG. 7 illustrates an example of a portion of a business configuration object, and, more specifically, illustrates a portion of a country business object 702. In the example, it is assumed that a primary characteristic of business configuration objects such as the country object 702 include a need to provide read-only access during application runtime. Moreover, data access may be required to be performed in a very efficient manner which minimizes resource consumption. Further, access of the same data instances may be required frequently within one transaction, so that suitable buffering strategies should be considered.

In addition to these characteristics, such business configuration objects may benefit from pre-defined data access tasks/methods. For example, a retrieval of language-dependent code value names may be required, such as in the case of the country business object 702 which may include language-dependent text. Somewhat similarly, existence checks for existence of code values within the configuration business objects may represent an additional typical use case.

Thus, as described above with respect to FIG. 6, the code generator 102 may be configured to generate both the generated code 112 which is not domain-specific, as well as the domain-specific generated code 114 for a domain defined with respect to business objects such as the country business object 702 of FIG. 7. In the former case, for example, a programming interface "class ROOT, method RETRIEVE," may be defined to retrieve the data of all node elements for a given list of root instances.

Furthermore, specifically for the domain defined with respect to the business configuration object such as the country business object 702 of FIG. 7, the domain-specific generated code 114 may include a programming interface "class ROOT, method EXIST," which provides the above-referenced functionality of checking whether a given code value exists or not. As a further example, the domain-specific generated code 114 may include a programming interface, "class ROOT, method GET_TEXT," which is configured to retrieve language-dependent text for a given list of root instances.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer readable storage medium and executable by at least one processor, the system comprising:
    a code generator configured to cause the at least one processor to determine an object metadata model which defines structures and behaviors of objects adapted for use in at least one software application being executed using a runtime engine, and which fails to define a domain-specific application program interface (API) for a domain associated with the at least one software application; the code generator including
        an object analyzer configured to determine object properties of a plurality of object instances of the object metadata model,
        a domain analyzer configured to determine the domain as being associated with the plurality of object instances, based on the object properties, and
        a template selector configured to select a domain-specific code template based on the domain,
    wherein the code generator is further configured to cause the at least one processor to generate the domain-specific API configured to facilitate interactions of the plurality of object instances during subsequent execution of the at least one software application using the runtime engine, using the domain-specific code template.

2. The system of claim 1, wherein the object analyzer is configured to interpret the object properties based on the object metadata model.

3. The system of claim 1, wherein the domain analyzer is configured to utilize a domain-specific meta-model to determine the domain associated with the plurality of object instances.

4. The system of claim 1, wherein the domain analyzer is configured to utilize object categories defined by the object metadata model to determine the domain associated with the plurality of object instances.

5. The system of claim 1, wherein the template selector is configured to compare the object properties of the plurality of object instances as provided by the object analyzer with the domain as provided by the domain analyzer to select the domain-specific code template.

6. The system of claim 1, wherein the template selector is configured to select the domain-specific code template, based on application requirements of the at least one software application.

7. A computer-implemented method for causing at least one processor to execute instructions recorded on a computer-readable storage medium, the method comprising:
    determining an object metadata model which defines structures and behaviors of objects adapted for use in at least one software application being executed using a runtime engine, and which fails to define a domain-specific application program interface (API) for a domain associated with the at least one software application;
    determining object properties of a plurality of object instances of the object metadata model;
    determining the domain as being associated with the plurality of object instances, based on the object properties;
    selecting a domain-specific code template based on the domain; and
    generating the domain-specific API configured to facilitate interactions of the plurality of object instances during subsequent execution of the at least one software application using the runtime engine, using the domain-specific code template.

8. The method of claim 7, wherein the determining the domain associated with the plurality of object instances comprises:
    utilizing a domain-specific meta-model to determine the domain associated with the plurality of object instances.

9. The method of claim 7, wherein the determining the domain associated with the plurality of object instances comprises:
    utilizing object categories defined by the object metadata model to determine the domain associated with the plurality of object instances.

10. The method of claim 7, wherein the selecting the domain-specific code template based on the domain comprises:
    comparing characteristics of the plurality of object instances with the domain to select the domain-specific code template.

11. The method of claim 7, wherein the selecting the domain-specific code template based on the domain comprises:
    selecting the domain-specific code template, based on application requirements of the at least one software application.

12. A computer program product, the computer program product being tangibly embodied on a non-transitory computer-readable medium and comprising instructions that, when executed, are configured to cause at least one processor to:
    determine an object metadata model which defines structures and behaviors of objects adapted for use in at least one software application being executed using a runtime engine, and which fails to define a domain-specific application program interface (API) for a domain associated with the at least one software application;
    determine object properties of a plurality of object instances of the object metadata model;
    determine the domain as being associated with the plurality of object instances, based on the object properties;
    select a domain-specific code template based on the domain; and
    generate the domain-specific API configured to facilitate interactions of the plurality of object instances during subsequent execution of the at least one software application using the runtime engine, using the domain-specific code template.

13. The computer program product of claim 12, wherein the instructions, when executed, are configured to utilize a domain-specific meta-model to determine the domain associated with the plurality of object instances.

14. The computer program product of claim 12, wherein the instructions, when executed, are configured to compare the object properties of the plurality of object instances with the domain to select the domain-specific code template.

15. The computer program product of claim 12, wherein the instructions, when executed, are configured to select the domain-specific code template, based on application requirements of the at least one software application.

16. The system of claim 1, in which the object metadata model includes defined classes of the objects, and wherein the domain is not defined as such within the defined classes.

17. The system of claim 1, wherein the code generator is configured to generate, in addition to the domain-specific API, an object-specific API that is defined in terms of the object metadata model and that also facilitates execution of the at least one software application.

* * * * *